June 24, 1952 — L. B. HOWARD — 2,601,526
TRAILER STEERING MECHANISM
Filed Aug. 5, 1949 — 2 SHEETS—SHEET 1

INVENTOR,
Leslie Brockway Howard
BY
ATTORNEY

June 24, 1952 — L. B. HOWARD — 2,601,526
TRAILER STEERING MECHANISM
Filed Aug. 5, 1949 — 2 SHEETS—SHEET 2

INVENTOR.
Leslie Brockway Howard
BY
ATTORNEY

Patented June 24, 1952

2,601,526

UNITED STATES PATENT OFFICE 2,601,526

TRAILER STEERING MECHANISM

Leslie Brockway Howard, Chico, Calif.

Application August 5, 1949, Serial No. 108,780

1 Claim. (Cl. 280—33.55)

This invention relates to an earth scraping implement.

In the harvesting of various crops, it is usual to shake the trees to cause their crop to fall to the ground, the crop being thereafter picked up from the ground by a suitable pick-up machine. To simplify this operation, it is desirable that the ground be as smooth and level as possible. The present invention provides a machine which is particularly suited to the leveling of ground in and around trees, the device being particularly characterized by its simplicity of construction and by its ability to turn on a relatively short radius so that it may work in and around trees or other plants and which otherwise would provide an obstacle to the utilization of earth scraping implement of the character known heretofore.

It is in general the broad object of the present invention to provide a novel form of earth scraping implement, particularly one which can be utilized to level earth in and around trees or other objects growing closely together.

The invention includes other objects and features of advantage, some of which, together with the foregoing, will appear hereinafter wherein the present preferred form of earth scraping implement of this invention is disclosed.

In the drawings accompanying and forming a part hereof, Figure 1 is a plan view showing the earth scraping implement of this invention.

Figure 1:
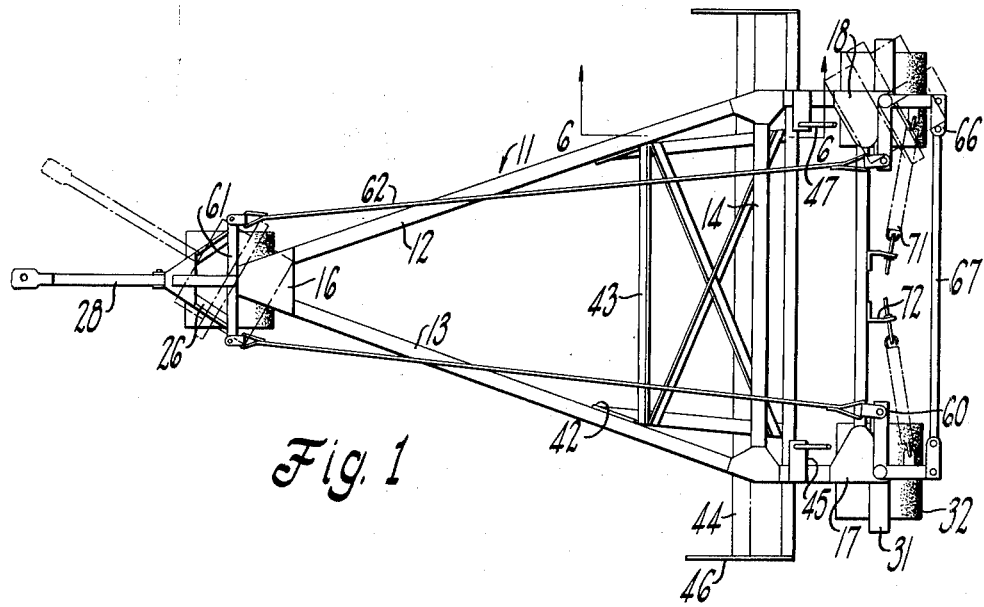
Figure 2:
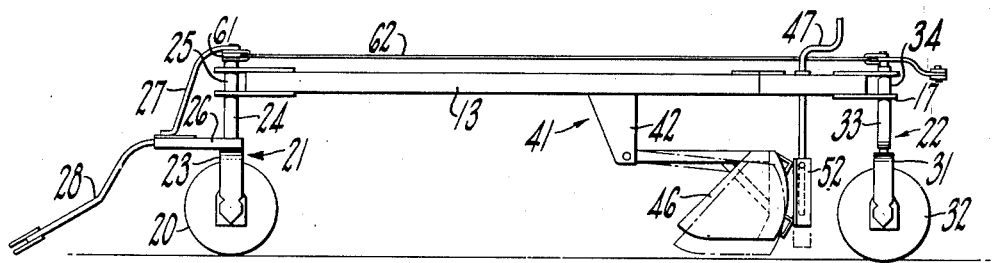
Figure 2 is a side elevation of the earth scraping implement.
Figure 3:
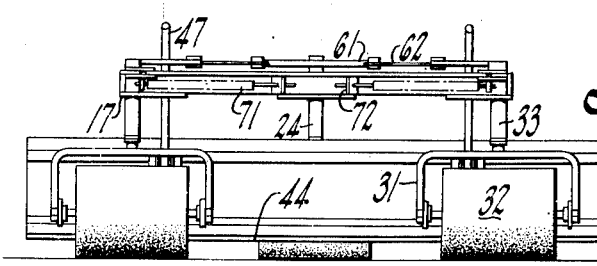
Figure 3 is a rear view of the earth scraping implement.

Referring to the drawings, and particularly to Figure 1 thereof, the device includes a main frame indicated generally at 11, such frame being triangular in a horizontal plane, as appears in Figure 1. The frame is made up of horizontal frame members 12, 13 and 14 joined together at their several abutting ends by upper and lower plates 16, 17 and 18.

To provide for movement of the device over the ground a front wheel structure, generally indicated at 21, is provided at the forward end of the frame, while rear wheel structures 22 are provided at each rearward corner of the frame.

The front wheel structure 21 includes a roller 20 mounted for rotation in a fork 23 having an upwardly extending stem 24 journalled for rotation in a bearing 25 mounted in the plates 16. A tongue frame 26 is mounted upon the fork while a brace 27 is extended from the forward end of the tongue frame 26 to the upper end of stem 24. A tongue 28 extends forwardly from the tongue frame 26 for attachment to a suitable dirigible vehicle as a tractor so that the earth scraping implement can be moved suitably over the earth.

Each of the rear wheel structures 22 includes a fork 31 having a wheel 32 suitably journalled therein; the fork 31 includes an upstanding stem 33 journalled in a bearing 34 mounted in the plates 17 and 18, respectively.

To work the earth suitably, an earth working tool, indicated generally at 41 is provided. The support for the tool 41 is provided by a pair of brackets 42 which depend from each of the side members 12 and 13. A tool support frame, indicated generally at 43 is hinged upon the brackets 42 and carries a scraper blade 44. To prevent the earth from spilling out past the ends of the blade, wings 46 are secured at each end of the blade.

Figure 4:
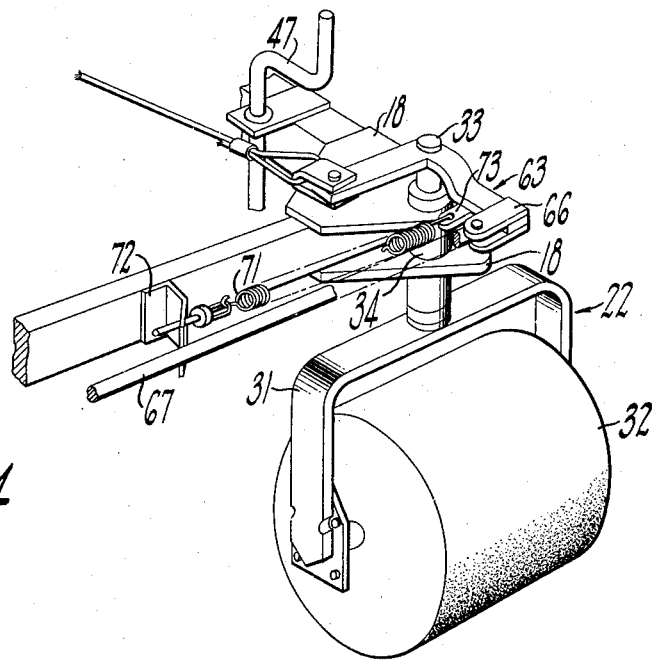
Figure 4 is a perspective view illustrating the mounting of a portion of the adjusting mechanism for the earth scraping tool, the mounting of a wheel and a portion of the steering mechanism.
Figures 5, 6:
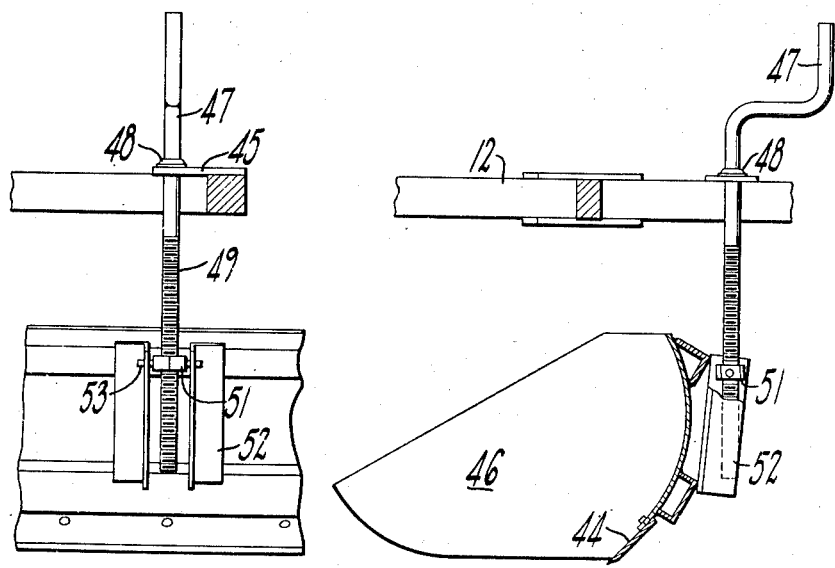
Figure 5 is a fragmentary view illustrating the construction of the means utilized for raising and lowering of the earth scraping tool.
Figure 6 is a section taken along the line 6—6 in Figure 1, showing a portion of the construction of th earth scraping tool and the means utilized for adjusting the tool.

To raise and lower each end of the earth working tool as is desired, a member 45 is secured to each of the side frame members 12 and 13 (see Figures 4 and 5). A crank 47 extends through the member, the crank carrying a ring 48 secured thereto and riding upon the member 45. The lower end of the crank is threaded as at 49 and is engaged with a nut 51; the latter is mounted between brackets 52 on the back of the blade 44 by pins 53 which extend through suitable apertures (not shown) in the brackets 52 to permit the blade to be moved up and down about the brackets 42 into any desired position of adjustment with respect to the earth.

To permit of ready movement of the earth scraping implement in and around closely placed objects such as trees, a cross bar 61 is mounted upon stem 24 carried upon the front wheel structure 21. A rod 62 is extended from each end of the cross bar 61 to a lever arm 60 of bell crank 63 which is secured to each supporting shaft 33 for the rear wheels 22; the other lever arm 65 of the belt crank carries a clevis 66 to which a rod 67 is secured. The rod 67 is extended between each of the bell cranks 63 at the rear of the earth scraping device so that the rear wheels are moved simultaneously and to same extent and in the same direction. Thus, referring particularly to Figure 1, if the front wheel is moved in a clockwise direction, as is indicated by the dotted lines, then the rear wheels are moved in the opposite or in a counter-clockwise direction. This permits the device to pivot about a relatively small radius for movement over the earth.

The steering movement of the device is facilitated by attaching a spring 71 between a bracket 72 on the rear cross member 14 and ear 73 secured to the other lever arm 65 of the bell crank 63. This maintains the several wheels in a nice adjustment and ensures their simultaneous movement.

From the foregoing, I believe it will be apparent that I have provided a relatively novel and simple earth scraping tool particularly suited to use in orchards and other areas where operation of a tool having a relatively short turning radius is required.

I claim:

A dirigible land leveler consisting of a substantially triangular frame, a wheel at each corner of said triangular frame providing a leading wheel and spaced trailing wheels, forks supporting said frame on each of said wheels, each fork having a stem mounted for rotational steering movement in said frame, a tongue frame extending forwardly from the leading wheel fork, a brace extending from the forward end of said tongue frame to the upper end of the stem of the leading wheel fork and at a point above said triangular frame, a tongue secured to said tongue frame for moving the leveler over the earth, a cross bar secured to the stem on the leading wheel at a point substantially coinciding with the point of attachment of said brace, a bell crank on each stem of each trailing wheel, a connection between each end of the cross bar and one lever of each bell crank, a clevis on each of the other levers of the bell crank, a connection between each clevis extending parallel to that element of the triangular frame between said trailing wheels, and a spring extended between each of the other levers of the bell crank and said triangular frame element between said trailing wheels and biasing said trailing wheels into a direct trailing position.

LESLIE BROCKWAY HOWARD.

REFERENCES CITED

The following references are of record in the file of this patent:

UNITED STATES PATENTS

| Number | Name | Date |
| --- | --- | --- |
| 151,656 | Farmer et al. | June 2, 1874 |
| 707,520 | Pickard | Aug. 19, 1902 |
| 901,387 | Schuckman | Oct. 20, 1908 |
| 973,711 | Sevison et al. | Oct. 25, 1910 |
| 1,303,591 | Peterson | May 13, 1919 |
| 1,497,383 | Royer | June 10, 1924 |
| 1,564,662 | Flemister | Dec. 8, 1925 |
| 2,015,891 | Greiner et al. | Oct. 1, 1935 |
| 2,388,692 | House | Nov. 13, 1945 |

FOREIGN PATENTS

| Number | Country | Date |
| --- | --- | --- |
| 42,493 | Germany | Feb. 25, 1888 |
| 464,806 | Germany | Aug. 28, 1928 |